United States Patent [19]

Brandao et al.

[11] 4,017,853
[45] Apr. 12, 1977

[54] RADAR DISPLAY SYSTEM

[75] Inventors: Ruy L. Brandao; Robert A. Taylor, both of Fort Lauderdale, Fla.

[73] Assignee: The Bendix Corporation, Southfield, Mich.

[22] Filed: July 11, 1975

[21] Appl. No.: 595,967

[52] U.S. Cl. .................... 343/5 DP; 340/173 AM
[51] Int. Cl.² .................... G01S 9/02; G11C 8/00
[58] Field of Search ............ 340/173 AM; 328/123; 343/5 DP

[56] References Cited

UNITED STATES PATENTS

| | | | |
|---|---|---|---|
| 3,617,719 | 11/1971 | Wong | 343/5 DP X |
| 3,633,173 | 1/1972 | Edge | 343/5 DP X |
| 3,685,020 | 8/1972 | Meade | 340/173 AM X |
| 3,765,018 | 10/1973 | Heard et al. | 343/5 DP X |
| 3,827,027 | 7/1974 | Towson et al. | 343/5 DP X |
| 3,881,101 | 4/1975 | Pederson | 343/5 DP X |

*Primary Examiner*—Malcolm F. Hubler
*Attorney, Agent, or Firm*—W. G. Christoforo; Bruce L. Lamb

[57] ABSTRACT

In a radar display system wherein radar return signals are received at a first rate and displayed at a second, usually higher rate, each radar return signal is digitized and used to update a main memory comprised of a random access memory so that the main memory contains information related to a plurality of radar return signals arranged therein in a logical order. The main memory information is continuously clocked out for display by an address counter which counts through two complete cycles in a first stage before incrementing a second stage so that the stored information related to each radar return signal is read out for display twice consecutively before the stored information related to the next radar return signal is read out for display.

3 Claims, 2 Drawing Figures

RADAR DISPLAY SYSTEM

BACKGROUND OF THE INVENTION

This invention relates to improvements in data display systems which are adapted for use with radar indicators and video storage devices therefor of the type wherein data is received at a relatively low rate and displayed at a different rate, generally many times faster, to obtain a relatively non-flickering, steady high resolution image. The invention has particular application in airborne weather radar systems and radar navigation sytems.

A basic display system and radar indicator of the above type is described in U.S. Pat. No. 3,803,600 and an improvement system is described in U.S. Pat. application Ser. No. 418,154, filed Nov. 21, 1973 now U.S. Pat. No. 3,964,064. It was explained in those documents that a radar return signal is converted into a train or trains of binary bits and the bits temporarily stored in an input buffer at a rate selected in accordance with desired radar range. The bits are optionally integrated to eliminate extraneous signals, such as those caused by noise or other interference and subsequently entered from the input buffer into a main memory where the bits are stored. It is also explained how, at the proper time for display, the memorized bits related to a particular radar return signal are recalled from the memory and stored into an output buffer from whence they are subsequently called for display twice in succession before the memorized bits corresponding to the next radar return signal to be displayed are called from the memory. This means of storage and display permits the quality of the display to be independent of the pulse repetition frequency of the radar system and hence a minimum pulse repetition frequency could optionally be used and still retain a relatively bright, continuous display. As a result, the average power consumed by the transmitter portion of the radar system could be much less than that required by systems having a higher pulse repetition frequency.

Although the above cited art showed a main memory in the form of a continuously recirculating memory since that form of memory was economically advantageous and hence used in the preferred embodiment of the invention, a random access main memory was contemplated to be within the scope of that art since a random access memory (RAM) could obviously be substituted for the recirculating memory.

SUMMARY OF THE INVENTION

It has been found that in a radar display system of the type herein described above and which uses a RAM main memory section a simple modification of the required control signal generating means of the device will permit the elimination of the aforementioned output buffer while retaining all the desirable features of the device. This is accomplished in systems where it is desired to display information related to each radar return signal twice consecutively before a subsequent radar return signal is displayed by splitting the existing control signal generating means, which in essence is a multistaged counter operating from a signal frequency source, into two sections, and inserting a simple idling flip-flop therebetween. The length of the first counter section is arranged such that that section counts through one complete cycle of operation when the number of clock pulses applied thereto is equal to the number of bits required to display a single radar return signal. At the completion of one complete cycle of the first counter section the idling flip-flop is triggered by the counter first section from its initial state into a second state without affecting the state of the counter second section. The counter first section will then count through a second cycle, which will be identical to the first cycle, at the conclusion of which the flip-flop is triggered back to its initial state to increment the counter second section. The counter is used to address the various cells of the random access memory, a different cell at each clock pulse applied thereto, so that those cells storing a particular radar return signal will be addressed twice in succession before other cells storing a subsequent radar return signal are addressed.

It is thus the object of this invention to provide a cost saving improvement to radar display systems using digital memories of the RAM or similar type.

DESCRIPTION OF THE PREFERRED EMBODIMENT

Figure 1:
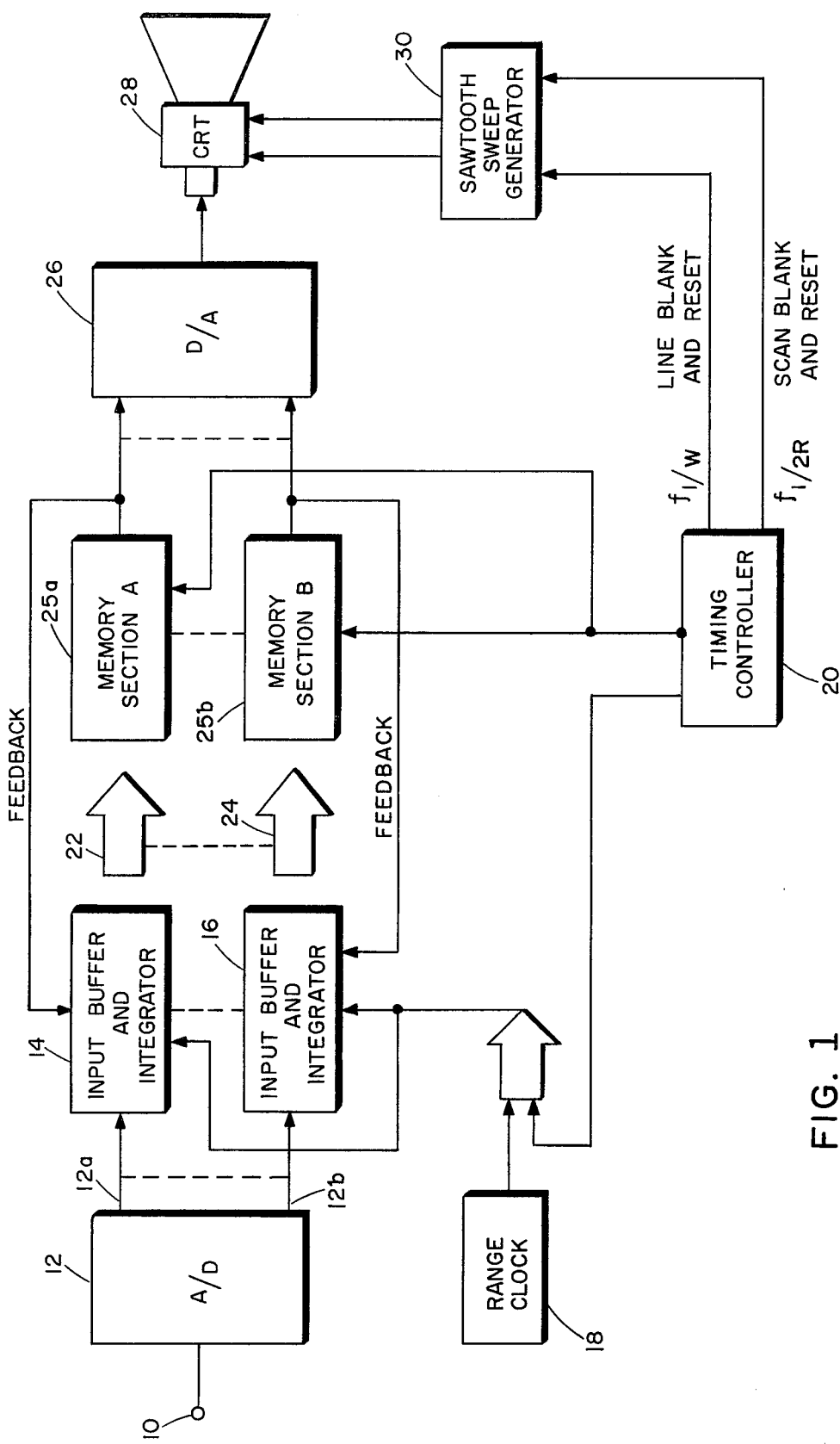
FIG. 1 is a simplified block diagram of the display system in which the invention can be used.

Referring to FIG. 1 there is seen an input terminal 10 upon which analog video data is impressed. The means for obtaining analog video data is well known to those skilled in the art and need not be described at this time. The video comprises the radar return intercepted by a radar receiver in response to a transmitted radar pulse. The analog video signal is suitably impressed on terminal 10 at the rate the radar return is intercepted by the radar receiver. Terminal 10 is suitably connected to an analog to digital converter 12 wherein the analog radar return signal is digitized. In the embodiment to be described each range cell of the radar return signal is digitized into two binary bits resulting in, of course, a signal having four possible levels. As will be made obvious, the digitizing of a complete radar return signal will result in the generation of two parallel words, where a word is defined as a serial train of binary bits. For convenience and to allow for the economical use of commercially available MOS integrated circuits, words in the preferred embodiment are chosen to be 128 bits in length. In order to store these two parallel generated words and subsequent parallel words generated in response to subsequent radar return signals, parallel input buffers and integrators and memory sections are shown. It should be obvious as this description proceeds that it is possible to provide a data display system of this type having a different number of display levels by providing additional elements parallel to those to be described. In any event, for the embodiment being described, the binary signal output of converter 12 is connected via lines 12a and 12b to input buffers and integrators 14 and 16, respectively. Digital data corresponding to and describing a radar return signal is strobed into the input buffers and integrators by a clock signal of a predetermined number of bits for each radar return and of a pulse repetition frequency which depends on the desired radar range as will be more fully described below and which is preferably operator selectable. This clock signal is obtained from a range clock 18 the proper time after the radar set transmits the radar pulse. The large arrow issuing from range clock 18 represents here and elsewhere in the figure, various gates for switching signals in a time sequence which is controlled by timing controller 20 through the various elements of the embodiment. How this is accomplished is known to those skilled in the art. The manner of operation of the system of FIG. 1 is, briefly, as follows: Immediately after the radar set (not shown) associated with this illustrated display system transmits a radar pulse, the return from which comprises the radar return signal, range clock 18 generates a predetermined number of range clock pulses. In this embodiment 128 range clock pulses are generated, this corresponding to the desired number of bits in a word. Each of these bits corresponds to a range cell. The range clock pulses cause parallel words, which define the radar return signal, to be clocked into input buffers and integrators 14 and 16. Optimally, a number of adjacent radar return signals are integrated within the input buffers and integrators, as known to those skilled in the art. Also as known in the art, words resulting from the integration are periodically applied to main memory 25 comprised of two parallel sections 25a and 25b herein also termed memory sections A and B, respectively, through gates 22 and 24 at an $f_1$ rate from input buffers and integrators 14 and 16, respectively in response to timing signals from timing controller 20. Each memory section includes the capacity to store an integral number of words, preferably the number of words in a complete radar antenna scan. In this embodiment each memory section has the capacity to store 128 words.

Feedback is shown from each memory section to its associated input buffer and integrator. This feedback corresponds to the previously memorized words being updated and permits scan to scan integration in the known manner.

The contents of the memory sections are continuously readout at the $f_1$ rate in ordered sequence in response to timing signals received from timing controller 20, being communicated through digital to analog converter 26, where the analog nature of the information to be displayed is restored, to cathode ray tube (CRT) 28.

Timing controller 20 is preferably comprised of a master oscillator which feeds a cascade of binary counters so that various timing signals which are coherent with one another are obtained. Among these timing signals is a train of pulses at a repetition frequency of $f_1/W$ where W is equal to the number of bits in a word (128). This train of pulses is synchronized so that each of its pulses occur at the same time as an $f_1$ pulse which clocks the last bit of a word into or out of the memory. A further coherent timing signal is at a pulse repetition frequency of $f_1/2R$, where R is the number of bits stored in a memory section (16384). This train of pulses is synchronized so that each pulse occurs at the same time as the $f_1$ pulse which clocks the last bit of a complete scan from a memory section. These timing signals comprise line blank and reset and scan blank and reset signals, respectively, and are applied to sawtooth sweep generator 30 which controls the raster of CRT 28.

Briefly, sawtooth sweep generator 30, in response to the timing signals applied thereto, blanks the CRT scan and resets it for a new scan at the completion of a complete read-out of the contents of memory sections A and B, and additionally blanks the CRT line sweep and resets it for a new line sweep at the completion of a single read-out of each word.

Figure 2:
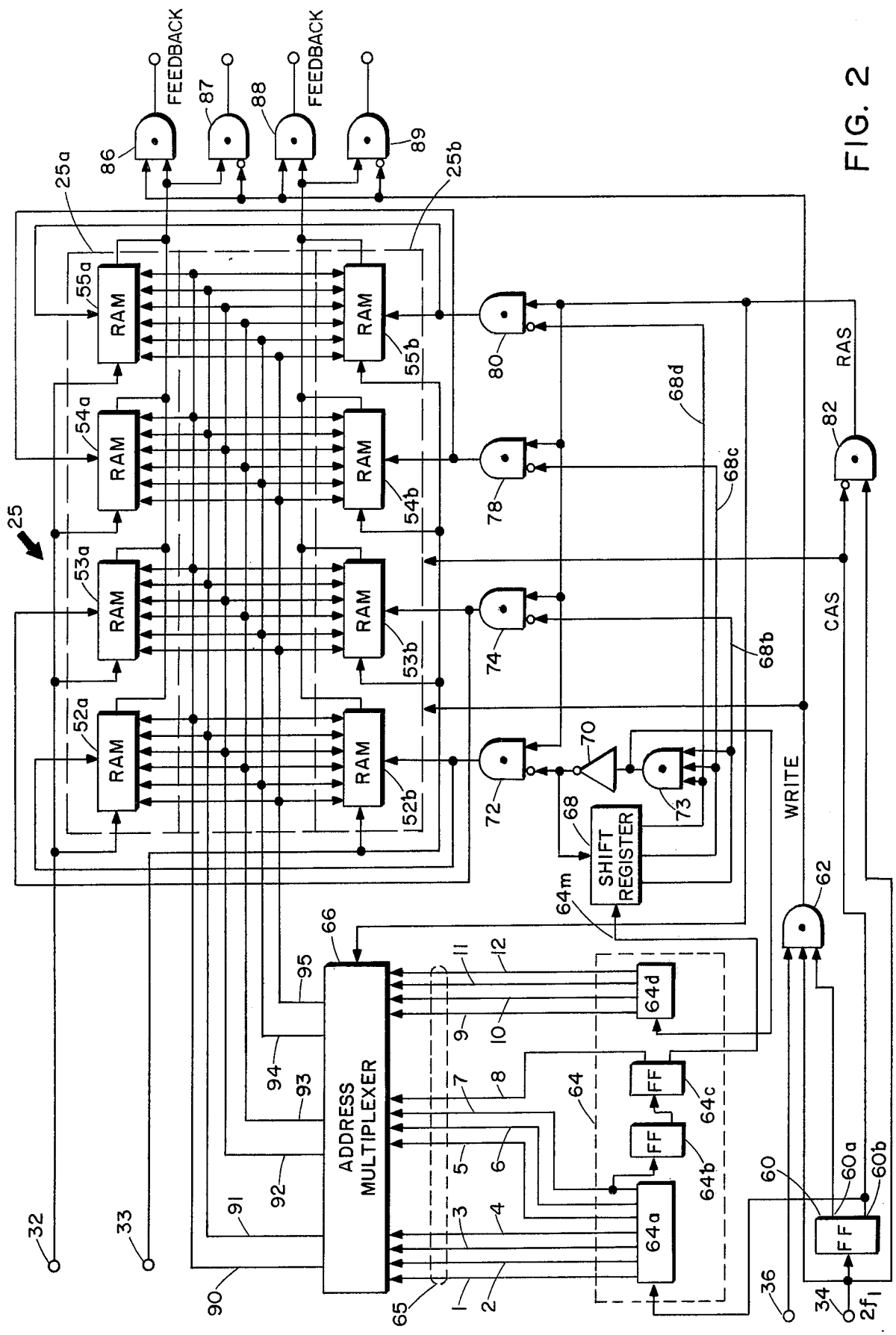
FIG. 2 is a block diagram of the preferred embodiment of the invention.

It is desired that each of the words stored in parallel in memory sections A and B be displayed twice consecutively and adjacent to one another on the CRT before the next parallel words are displayed. This produces a particularly steady and flicker-free display on the CRT. In the prior art, this was accomplished by reading words out of the memory into an output buffer and then non-destructively reading the words stored in the output buffer into the CRT through a digital to analog converter twice. In FIG. 2, reference to which should now be made, means are shown for accomplishing the same function when using random access memories (RAM) without resorting to the use of output buffers.

In FIG. 2 a first word comprising the least significant bits describing an integrated radar return and obtained through gate 22 of FIG. 1 is impressed at terminal 32, while a second word parallel to the first word and comprising the most significant bits and obtained through gate 24 of FIG. 2 is impressed simultaneously at terminal 33. These words are impressed at terminals 32 and 33 serially by bits respectively at the $f_1$ rate and at the time associated portions of memory sections 25a and 25b, comprising memory 25, are to be updated, as known in the prior art.

Memory 25, which is communicated with terminals 32 and 33, is comprised of two parallel sections, section 25a wherein the first words are stored and section 25b wherein the second words are stored. Each memory section in this embodiment includes the capacity to store 16384 bits of binary information. This, of course, corresponds to the 128 words of 128 bits capacity described earlier. Each memory section is shown to be comprised of four RAM memory elements, for example, elements 52a, 53a, 54a and 55a of memory portion 25a and elements 52b, 53b, 54b and 55b of memory portion 25b. Each of these elements is preferably identical and has a capacity for storing 4,096 binary bits. Four RAM elements are used in each memory portion so as to make economical use of commercially available devices.

As seen in the figure, a signal having a pulse repetition frequency of $2f_1$ and obtained from the master oscillator which it was previously mentioned comprises a part of timing controller 20, is impressed at terminal 34 and applied to the toggle terminal of flip-flop 60 which can be considered to be part of the timing controller 20. In response thereto flip-flop 60 generates $f_1$ signals (pulse repetition frequency equal to $f_1$) at its set and reset output terminals 60a and 60b, but displaced 180° from one another. Terminal 60a is connected as one input to AND gate 62 which has a second input connected to terminal 34 and a third input connected to terminal 36. The signal impressed at terminal 36 is such as to qualify gate 62 during the time that words are impressed at terminals 32 and 33 for updating the memory. Means for generating this signal are known in the art. The $f_1$ signal at terminal 60b is applied to increment element 64a of a counter 64 and also to inhibit gate 82. Element 64a is a seven stage binary counter in this embodiment with output lines 1 through 7 connected respectively to each of the stages. The signal at terminal 60b also comprises the column access strobe (CAS) of memory 25 and is applied thereto, and more particularly to each element thereof, to column address the various elements.

Gate 82 generates the row access strobe (RAS) for memory 25 when the CAS signal at terminal 60b is low. The RAS is applied through one gate 72, 74, 78 or 80 at a time, as will be explained below to row address one pair of RAM elements at a time, for example, elements 52a and 52b, 53a and 53b, 54a and 54b, or 55a and 55b. The reason for this scheme of row addressing will be explained below.

Counter 64, which is preferably a binary counter, is comprised in this embodiment of elements 64a and 64d together with flip-flops 64b and 64c. As mentioned above, element 64a is a seven stage binary counter while element 64d together with flip-flop 64c comprises a five stage binary counter. Flip-flop 64b is the aforementioned idling flip-flop.

As seen, the output of element 64a is applied to the toggle terminal of flip-flop 64b. Thus, element 64a is incremented each cycle of the $f_1$ signal on terminal 60b, while flip-flop 64b is toggled once for every 128 cycles of the same $f_1$ signal. This flip-flop permits counter element 64a to count through two complete cycles before the remainder of the counter comprised of flip-flop 64c and element 64d is incremented once. As will be made clear as this description continues this feature of the invention permits each word stored in memory 25 to be read-out twice in succession before the next word is read-out.

Flip-flop 64c which is toggled each 256 cycles of the $f_1$ signal, has its reset output terminal connected to the input terminal of shift register 68 and its set output terminal comprising one of the lines (line 8) connecting counter 64 to address multiplexer 66.

Address multiplexer 66 is preferably comprised of a plurality of gates which steer the signals on various of the counter 64 output lines 1–12 to the multiplexer output lines 90–95. Specifically, address multiplexer 66 normally steers the signals on lines 1–6 of counter 64 on to lines 90–95, respectively. It will be noted, however, that the output tap of gate 82 is also connected to address multiplexer 66. When the signal at that tap goes high, that is, when the RAS is generated, address multiplexer 66 is altered to steer the signals on lines 7–12 of counter 64 on to lines 90–95, respectively.

It will also be noted that lines 90–95 are respectively connected to the address terminals of the various RAM elements. It should now be obvious to one skilled in the art that the RAM elements shown here are of the type which have only six address lines each, a particular cell in a RAM element being addressed by identifying a column and a row in two sequential steps. Specifically, a particular cell is addressed by impressing the column address on lines 90–95 simultaneously with the CAS and then by impressing the row address on lines 90–95 simultaneously with the RAS. Of course, random access memories which are row and column addressed simultaneously and thus require additional addressing lines are known in the art. It is deemed that memories of the latter type are included within the teachings of the present invention.

As previously mentioned, each RAM element is column addressed simultaneously since the CAS is applied simultaneously to each element. However, the RAM elements are row addressed and read-out (or updated) in associated pairs. This is accomplished through the use of shift register 68 through which a logical 0 is continuously circulated in response to the signals on line 64m, which line comprises the reset output terminal of flip-flop 64c. Shift register 68 is comprised of four cascaded binary stages, the last three stages of which are connected respectively to output lines 68b, 68c and 68d which, in turn, are connected to inhibit terminals of gates 74, 78 and 80, respectively. In addition, the shift register output lines are connected as inputs to AND gate 73, whose output is connected through inverter 70 to the inhibit terminal of gate 72 and also as an input to the first shift register stage. Thus, a logical 0 is circulated through shift register 68 so that gates 72, 74, 78 and 80 are sequentially qualified one at a time to permit the RAM elements to be row addressed by the RAS in associated pairs. The RAM elements in a system actually built each included 64 rows of 64 cells each. The particular addressing scheme used with this invention when considered in light of the above description of the memory and addressing means and as will become clearer below, automatically and timely refreshes the various RAM elements so that ancillary refreshing means are not required. The output signals from gate 73 are also connected to strobe counter section 64d. In this way, 256 consecutive bit positions or cells of each RAM element associated pair are addressed in groups of 128 cells which are addressed twice consecutively, after which the signal on line 64m causes the information in shift register 68 to be shifted one step, thus causing the next associated pair of RAM elements to be addressed. As an example of the operation of the addressing elements shown here, assume that the addressing elements are in an initial state wherein counter 64 output lines 1–12 are at logical 0, a logical 0 is in the first stage of shift register 68 and flip-flops 64b and 64c are in the reset state. Also assume that flip-flops 64b and 64c are toggled by positive-going transitions at their toggle terminals, shift register 68 is strobed by a positive-going input signal and counter section 64d is incremented by a positive-going input signal. Also assume that logical 0's on lines 7–12 address the first row of RAM elements being addressed and as the counter stages having these lines as outputs is incremented the row being addressed steps through the RAM element. In addition, it is assumed that logical 0's on each of lines 1–6 address the first column in the row being addressed and that as the counter stages having these lines as outputs are incremented, the column being addressed steps through the RAM element. Accordingly, it can be seen that the first 64 pulses at terminal 60b, assuming that the first pulse sets initial conditions, will cause the bit positions or cells in the first row of RAM elements 52a and 52b to be addressed in order. At the 65th pulse, line 7 goes to logical 1 thus toggling idling flip-flop 64b to the set state wherein it generates no output signal. The 65th through 128th pulses will now cause the bit positions in the second row of RAM elements 52a and 52b to be addressed in order. At the 129th pulse the signal on line 7 changes to logical 0. The counter is again at its initial condition except that flip-flop 64b is now in the set state. The 129–256 pulses thus cause the bit positions of the first and second rows of RAM elements 52a and 52b to again be addressed in sequence. At the 257th pulse line 7 again goes to logical 1, toggling flip-flop 64b to the reset state to thus toggle flip-flop 64c to the set state, generating a logical 1 at line 8. Accordingly, the next 256 pulses will address the bit positions of the third and fourth rows of RAM elements 52a and 52b in sequence twice. At the 513th pulse flip-flop 64c will again be toggled to thus cause a strobing pulse to be applied to shift register 68. It will be noted that initial conditions have again been achieved except that the logical 0 in shift register 68 is now in the second position of that shift register. Accordingly, RAM elements 53a and 53b will be row addressed during the next 512 pulses applied to counter 64, and in particular the first to fourth rows thereof in sequence twice. It should now be obvious that the RAM memory will be addressed as required to read each word twice into a display unit such as a cathode ray tube.

New information is entered into memory 25 for updating the memory in response to the signal generated by gate 62 and which is designated the WRITE signal. In response to the WRITE signal the RAM bit positions being addressed are changed or altered in accordance with the information at terminals 32 and 33. As can be seen, the WRITE signal is generated at the $f_1$ rate whenever gate 62 is qualified by the signal on terminal 36. The signal at terminal 36 is generated by means, not shown, but known in the art simultaneously with the appearance of new information at terminals 32 and 33. As known to those familiar with this art, one word in each memory section 25a and 25b is normally updated for each complete read-out of memory 25.

The WRITE signal is also applied to qualify AND gates 86 and 88. This permits the information being changed in memory 25 to be fed back to the input buffers and integrators 14 and 16 of FIG. 1 for the purpose of scan integration. In addition, the WRITE signal can also optionally be applied to inhibit gates 87 and 89 through which the memory data being read from memory 25 normally passes to the digital to analog converter 26 at FIG. 1. With gates 87 and 89 inhibited during the updating of memory 25 the instantaneous range line being drawn on CRT 28 will be blank. A blank line indicating that memory 25 is being periodically updated will thus slowly move through the display otherwise being presented on the CRT and will be a visual indication to the operator that updating is occurring.

In one modification of the invention, flip-flop 60 and counter 64 do not comprise part of the timing control 20 but are used in parallel therewith and synchronized therewith. In this case, a signal is obtained from the timing controller at a suitable time, usually at the completion of a complete reading of the information from memory 25, to reset flip-flop 60 and counter 64 to initial conditions.

As previously explained, the RAM elements actually used and described have a six line address access. Other standard RAM elements have a 12 line address access whereby both the row and column can be addressed simultaneously. From the description above it should now be obvious how to use these and other types of RAM elements to practice this invention.

Of course, other alterations and modifications of the invention will now be apparent to one skilled in the art. For example, it should now be possible for one skilled in the art to modify the invention so that a group of parallel words can be read-out of the memory for display more than twice consecutively before the next group of parallel words is read-out by altering the idling stage of counter 64 and adjusting the other elements and parameters of the system to conform therewith. Accordingly, the invention is to be limited only by the true spirit and scope of the appended claims.

The invention claimed is:

1. A digital data display system for displaying digital data bursts comprised of digitized data, each said data burst being related to a particular azimuth line of data to be displayed and including a memory means having a plurality of memory cells, said memory means being divided into groups of memory cells, each said group being associated with and for storing one of said data bursts, and addressing means for addressing each memory cell, seriatim, of a particular group at least twice before addressing the memory cells of a successive group, said display system having display means normally responsive to the data stored in a memory cell being then addressed and an input buffer for storing said data bursts prior to being stored in said memory means and until the particular group of memory cells associated with a data burst stored in said input buffer is addressed by said addressing means, said input buffer and memory means being responsive when the group of memory cells associated with a data burst stored in said input buffer is addressed for storing said data burst stored in said input buffer into its associated group of memory cells, said addressing means including means for suppressing said response of said input buffer and memory means to enter data bursts into said memory means after a group of cells is addressed once and until a subsequent group of cells is addressed.

2. The digital data display system of claim 1 wherein said addressing means comprised counter means having first and second cascades of binary counting stages with at least one idling flip-flop operationally disposed therebetween whereby said first cascade counts through at least two complete cycles before said second cascade is incremented once.

3. The digital data display system of claim 1 wherein said memory means comprises a random access memory.

* * * * *